Feb. 3, 1970 J. T. LINGLE 3,493,895

CURRENT FEEDBACK OSCILLATOR WITH INITIAL OVERDRIVE

Filed Jan. 5, 1968

INVENTOR,
JOHN T. LINGLE.

BY Milton W. Lee AGENT.
Harry M. Saragovitz,
Edward J. Kelly & Herbert Berl
ATTORNEYS.

United States Patent Office 3,493,895
Patented Feb. 3, 1970

3,493,895
CURRENT FFEDBACK OSCILLATOR WITH INITIAL OVERDRIVE

John T. Lingle, Bloomington, Minn., assignor, by mesne assignments, to the United States of America as represented by the Secretary of the Army Filed Jan. 5, 1968, Ser. No. 696,040
Int. Cl. H03k 3/281
U.S. Cl. 331—113 2 Claims

ABSTRACT OF THE DISCLOSURE

A low input voltage converter having a current feedback oscillator for producing an initial current overdrive pulse to rapidly switch the oscillator with low switching losses. A pair of transistors and a pair of feedback transformers function together as the oscillating unit with one of the feedback transformers having a low turns ratio which provides the desired overdrive current pulse for fast switching of the transistors while the other transformer provides normal drive for the oscillating unit.

BACKGROUND OF THE INVENTION

This invention relates generally to converters and more particularly to efficient DC to DC, DC to AC and DC to AC to DC power converters utilizing fast switching techniques with low power dissipation.

A considerable amount of time and effort has been expended heretofore in attempts to develop transistor switching circuitry possessing minimum switching delays and transients. As evidenced by the absence of pertinent prior art, attempts to effect such a quick switching arrangement have met with very little success.

SUMMARY OF THE INVENTION

The disadvantages of the prior art have been successfully overcome by utilizing, in the instance of a transistor converter, a pair of current feedback transformers which produce an overdive current pulse to a transistor oscillator for quickly switching the state of conduction of each transistor. The overdrive pulse serves to sweep out stored holes in the semiconductor devices resulting in the minimization of voltage transient time for effecting and extremely fast switching circuit.

The general purpose of this invention lies in the provision of a DC to DC transistor voltage converter capable of extremely fast and efficient switching.

BRIEF DESCRIPTION OF THE DRAWINGS

The exact nature of this invention will be readily apparent from consideration of the following specification relating to the annexed drawings in which.

DESCRIPTION OF THE INVENTION

Figure 1:
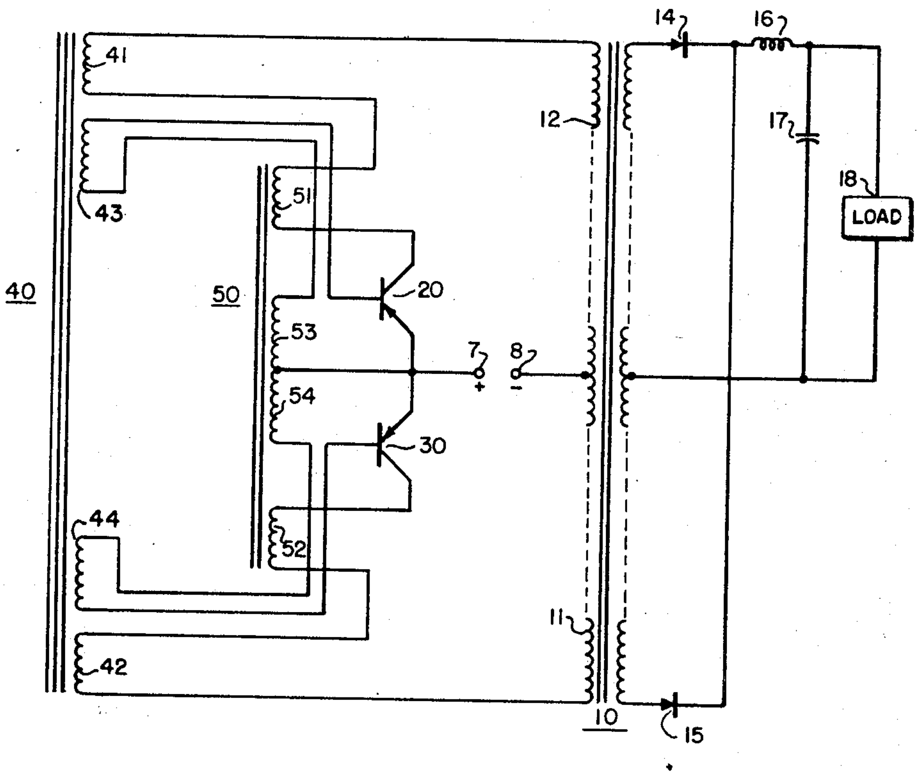
FIG. 1 illustrates a new and improved power converter constructed in accordance with the principles of the present invention.

FIG. 1 discloses a typical embodiment of a converter as envisioned by the instant invention. A multivibrator type transistor relaxation oscillator is inductively coupled through transformer 10 to a pair of rectifiers 14 and 15. The rectified signal is then smoothed by a filter, depicted as inductor 16 and capacitor 17, and supplied to load 18.

Figure 2:
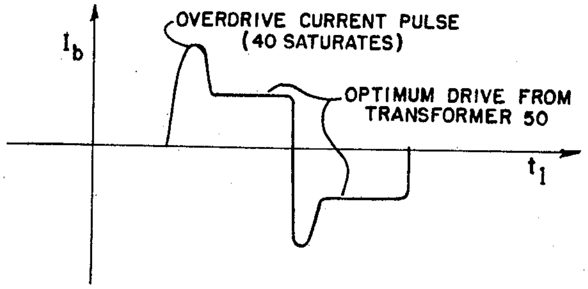
FIG. 2 depicts a typical overdrive current pulse as utilized in the circuit of FIG. 1 for effecting the desired switching characteristics.

The oscillator portion of the converter consists of a pair of transistors 20 and 30 and a pair of feedback transformers 40 and 50. Transformer 40 has a low turns ratio and hence supplies a high current drive pulse during the initial portion of each one half cycle, similar to that shown in FIG. 2. Transformer 40 is a conventional saturable core transformer constructed with core area, length, turns, and core steel such that it saturates rapidly and is effective only in inducing the high current overdrive for the initial 5 to 10% of each half cycle. Transformer 50 is a conventional transformer which functions to provide the normal drive for transistors 20 and 30 upon the saturation of transformer 40. Note further the series connection of the primary windings 41, 42, 51 and 52 of transformers 40 and 50 and the series connection of the secondary windings 43, 44, 53 and 54 of each transformer.

The DC input signal desired to be converted or amplified is applied between terminals 7 and 8 and may be derived from a conventional battery or a full wave rectifying power source. The positive input terminal 7 is connected to the common emitter connection of transistors 20 and 30. Assuming, for the purpose of discussion, a transistor 30 has just been switched into its nonconducting state and that transistor 20 is being initiated into a state of conduction, a small current will flow from the source across terminals 7 and 8 thru the emitter-collector junction of transistor 20, primary winding 51 of transformer 50, primary winding 41 of transformer 40, portion 12 of the primary winding of transformer 10 and back to the source. With a changing current flowing thru primary windings 51 and 41, voltages will be induced across secondary windings 53 and 43, respectively, rendering the base of transistor 20 more negative than the emitter for switching the transistor into its fully conducting state. Now as the current continues to increase thru transistor 20 and the primary windings of transformers 50 and 40, transformer 40 produces an overdrive current pulse (FIG. 2) in the secondary windings 43 and 44 of transformer 40 which drives the stored carriers out of the base region of transistor 30 and quickly switches transistor 30 into its nonconducting state and provides forward overdrive to transistor 20, driving it into the low saturation region. As transformer 40 saturates, the impedance to current flow thru the windings thereon suddenly decreases, thus in effect decoupling the windings. The induced voltage across secondary winding 43 is likewise decreased such that the result of the overdrive current pulse shown in FIG. 2 declines to a lower normal value for the rest of the cycle.

After an additional time interval transformer 50 will saturate and remove the drive current from transistor 20, increasing its impedance, cause it to start turning off, and initiate switching of the oscillator. The collapse of leakage flux linking the windings in transformers 40 and 50 will momentarily induce voltages of the opposite polarity in windings 43, 53, and 44, 54 back biasing transistor 20 while forward biasing transistor 30 into the conductive state. The flow of current through terminal 7 and the emitter collector junction of transistor 30, windings 52 and 42 induces feedback voltages in the base drive windings 54, 44 and 53, 43 of transformers 50 and 40 respectively. The lower turns ratio of transformer 40 forces overdrive current into the base of transistor 20 to force the stored carriers out of the base region and switch it off more rapidly. At the same time the overdrive current through winding 44 draws a high current pulse from the base of transistor 30 to rapidly drive it into the highly conductive state. With transistor 20 in its nonconducting state, transistor 30 begins its cycle of operation in the same manner as described with relation to transistor 20.

It will be apparent that the embodiment shown is only exemplary and that various modifications can be made in construction and arrangement within the scope of the invention as defined in the appended claims.

I claim:

1. In a low input power converter:
an electronic switching circuit operable between two states of conduction;
a pair of input power supply terminals connected to said switching circuit;
output means coupled to said switching circuit and adapted to be energized under control of said electronic switching circuit;
an output transformer having a center-tapped primary winding coupled to said electronic switching circuit with the secondary winding coupled to said output means;
one of said pair of input power supply terminals connected to said center tap of said output transformer with the other terminal connected to the switching circuit;
said switching circuit comprising first and second transistors connected in a push-pull arrangement and first and second feedback transformers with each feedback transformer having a pair of primary windings and a pair of secondary windings;
one of the primary windings of each of said first and second feedback transformers connected in series relationship with each other, with the emitter-collector junction of the first transistor, with the pair of input terminals and with one portion of the center-tapped primary winding of the output transformer while the other primary winding of each of said first and second feedback transformers is connected in series relationship with each other, with the emitter-collector circuit of the second transistor, with the pair of input terminals and with the other portion of the center-tapped primary winding of the output transformer;
one of the secondary windings of each of said first and second feedback transformers connected in series relationship with each other across the base-emitter junction of the first transistor while the other secondary winding of each of said first and second feedback transformers is connected in series relationship with each other across the base-emitter junction of the second transistor;
at least one of the transformers being of the saturable type having a low turns ratio for producing a sharp overcurrent pulse to quickly switch the transistor pair upon saturation and at least one conventional feedback transformer for normally driving the transistors.

2. The apparatus as set forth in claim 1, wherein the pair of push-pull transistors are connected such that their respective emitters are connected to form the common point to which one of said pair of input power supply terminals is connected.

References Cited

UNITED STATES PATENTS

| | | | |
|---|---|---|---|
| 3,146,406 | 8/1964 | Wilting | 331—113 |
| 3,323,075 | 5/1967 | Lingle | 331—113 |

JOHN KOMINSKI, Primary Examiner

U.S. Cl. X.R.

321—2